Figure 1:
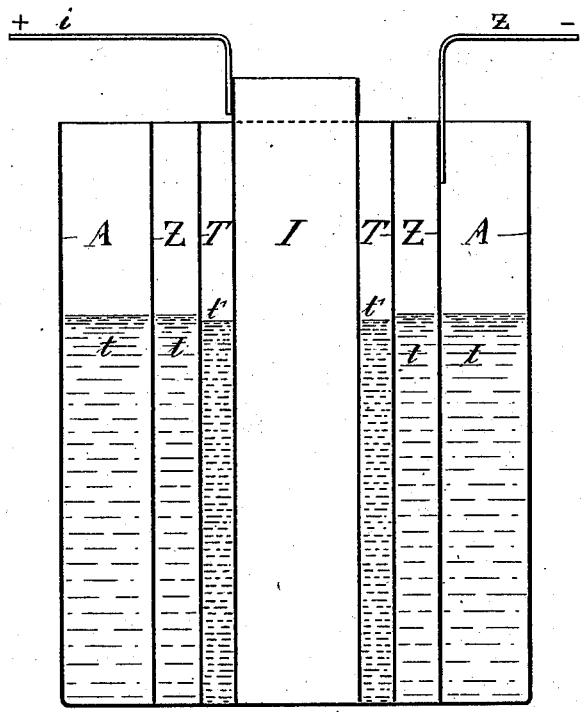

(No Model.)

S. KALISCHER.
SECONDARY BATTERY.

No. 311,007. Patented Jan. 20, 1885.

Witnesses.
J. A. Rutherford
Robert Corrett

Inventor.
Salomon Kalischer.
By James L. Norris.
Atty.

UNITED STATES PATENT OFFICE.

SALOMON KALISCHER, OF BERLIN, GERMANY.

SECONDARY BATTERY.

SPECIFICATION forming part of Letters Patent No. 311,007, dated January 20, 1885.

Application filed April 9, 1884. (No model.)

*To all whom it may concern:*

Be it known that I, SALOMON KALISCHER, of the city of Berlin, in the Kingdom of Prussia, and German Empire, have invented certain new and useful Improvements in Secondary Batteries, of which the following is a specification.

This invention relates to an improved electric accumulator, secondary battery, or storage-battery; and the object of my invention is to produce at a comparatively low-cost a secondary battery or electric accumulator whose elements are relatively light as compared with the elements hitherto used in storage-batteries, and thus facilitate the transportation of such batteries, while at the same time I obtain by my improved battery a current of great power and constancy.

My invention consists in the employment for the anode of carbon of any convenient form or nature, in combination with a solution of suitable salts of lead, the latter being subjected to the process of electrolysis to produce a dense and solid coating of peroxide of lead upon the carbon, said coating, on being metallically connected with a cathode of lead in the liquid remaining after the process of electrolysis, will constitute a secondary battery of high electro-motive power from which a constant current of long duration is obtained.

In my present invention peroxide of lead is precipitated upon a carbon anode by electrolysis, the carbon remaining unchanged and unaffected, while by the same electrolytic action metallic lead is carried over to and precipitated upon the cathode, which may be of lead.

In preparing this carbon element for my improved secondary or storage battery, carbon of any desired nature—such as charcoal, gas-coke, &c., plumbago, or any of the carbons generally used for electric purposes and of as pure quality as can be conveniently obtained—is formed into any desirable shape by cutting or forming from solid blocks, or by molding and pressing into shape crushed or pulverized carbon, so as to form, as far as is possible, a homogeneous carbon element. The shape or form of such an element may be that of a plate or a cylinder, or any convenient and desired shape and form. The element so formed is placed in a bath consisting of a solution of nitrate of lead or acetate of lead, or other suitable salt of lead, and subjected to the action of the galvanic current, lead being preferably employed for the cathode. Under the action of the said current peroxide of lead, either in a pure or hydrated state, is formed upon the anode in the shape of a black, dense, and solid layer or coating of a jet-black, a shining silky-black, or a velvety-black color, adhering firmly to the carbon and completely inclosing the same on all sides, while at the same time metallic lead is by the same action separated from the solution, carried over to and deposited upon the cathode. It will be readily understood that I can coat the said carbon with a solid layer of peroxide of lead of any desired and convenient thickness, depending on the quantity and concentration of the solution of the salt of lead used for the bath, and on the length of time during which the said solution is subjected to the action of the galvanic current. After the charge is completed the two electrodes are metallically connected, and will then produce a current which is constant and whose duration will be dependent only on the thickness of the coating of peroxide of lead produced upon the carbon anode during the charging operation.

In discharging the elements the peroxide of lead on the anode is reduced to protoxide of lead, while the metallic lead on the other electrode is oxidized and dissolved in the acid solution. The discharge being finished, the elements may at once be charged again by means of a galvanic current, and thus the operation of charging and discharging the battery may be repeated over and over again in continuous succession.

Figure 2:
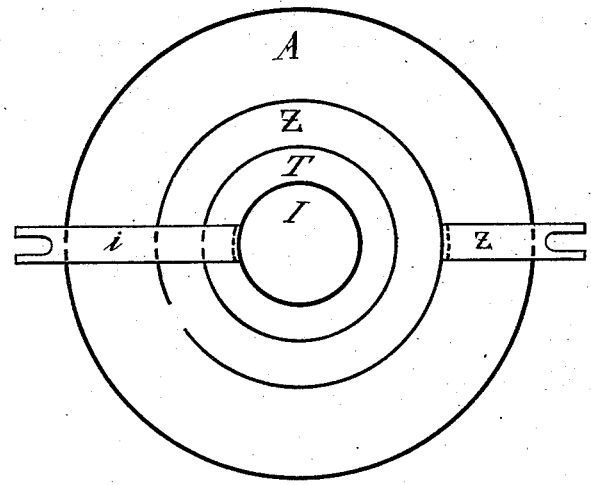

In the accompanying drawings, forming part of this specification, Figure 1 is a vertical section, and Fig. 2 a top view, of an element which will serve to illustrate my invention.

A is a glass receptacle; Z, a slotted cylinder of lead; T, a clay cell; I, a cylinder of carbon; $z$, a conductor connecting the cylinder Z with the negative pole of a suitable galvanic battery; $i$, a conductor connecting the carbon cylinder I with the positive pole of a battery; and $t\ t'$ are solutions of salts of lead, kept apart by the interposed clay cell T, so that there will be no communication between the cylinders Z and I.

The operation is as hereinbefore described—that is to say: Under the action of the galvanic currents from the said galvanic battery peroxide of lead is formed upon the anode or positive electrode I, while at the cathode or negative electrode Z metallic lead is separated from the solution and precipitated upon the said electrode Z. This operation may be understood by a resume of the actions and reactions in the battery. Supposing the electrolytic fluid to be a solution of nitrate of lead—that is, $PbN_2O_6$. This is decomposed by the current into $Pb+O+N_2O_5$—that is, into lead, oxygen, and anhydrous nitric acid. This free lead is immediately deposited at the cathode or negative electrode. At the anode $N_2O_5$ unites with water $H_2O$ to form $H_2N_2O_6=2$, $(HNO_3,)$ or two equivalents of nitric acid, while the liberated oxygen meets undecomposed nitrate of lead $PbN_2O_6=PbO+N_2O_5$ and unites with PbO to form $PbO_2$, or peroxide of lead, which is deposited upon the anode. Simultaneously the liberated $N_2O_5$ unites with an equivalent of water to form $2(HNO_3,)$, or nitric acid. This action is carried on so long as the current flows and there is left in the solution any undecomposed nitrate of lead. Within these limits it is carried on until there is a sufficient deposition of peroxide of lead, when, the current being cut off and the anode and cathode connected, a series of actions and reactions in reverse order takes place, causing a current to circulate in the circuit connecting them, which actions and reactions leave finally the carbon anode and the entire battery in their original condition. It will be seen from this that the deposition of peroxide is not a primary action, but a secondary action, or, rather, the result of a secondary electrolysis.

I wish it to be distinctly understood that the form or shape, as well as the general construction and arrangement, of the elements which I may employ is entirely immaterial for the purposes of my invention, which consists in employing for the anode carbon of any suitable form, and forming thereon a layer of peroxide of lead obtained by means of electrolysis from a solution of suitable salts of lead. I may employ an element of the shape of a "Daniell" element, or of a "Bunsen" element, or of any other element, and therefore I wish it to be distinctly understood that I do in no wise confine myself to the construction and arrangement shown in the drawings.

I am aware that it has been proposed to use carbon in fragments contained within a porous vessel, with the interstices filled with lead in division, or with a lead salt, and also that it has been proposed to form an element out of mingled carbonaceous material and a lead salt in powder, the material then being subjected to carbonization, so that the lead is disseminated through the body of the element. My invention differs from both these in that I use a carbon as homogeneous and as free from foreign elements as possible as a support for the lead salt, and deposit the salt by electrolytic action upon the exterior only, when it can be readily acted on without incurring the internal resistance of the cell. Hence I do not claim the use of carbon *per se*.

I am furthermore aware of the existence of a battery in which in the process of charging an electro-positive metal is deposited upon the negative electrode, which in the action of the battery becomes the positive electrode, such a battery embracing the combination, with a carbon and metal electrode, of an acid solution containing a salt of a metal—such as sulphate of zinc—electro-positive to carbon, and a metallic salt—such as sulphate of manganese—capable of forming under electrolytic action a depolarizing substance or compound on the positive electrode.

I disclaim the devices above set forth, and confine myself to the specific combination of elements embraced in my invention whereby I produce the results and advantages set forth by me.

What I do claim is—

In a secondary battery, the combination of a positive electrode made of pure or "naked" carbon, a negative electrode made of lead, and an electrolyte or solution of a lead salt, whereby in charging the battery peroxide of lead is deposited upon the positive electrode and metallic lead upon the lead electrode, substantially as described.

In testimony whereof I have signed my name to this specification in the presence of two subscribing witnesses.

SALOMON KALISCHER.

Witnesses:
  B. ROI,
  ADOLPH D'HEUREUSE.